Dec. 15, 1942.    F. E. JOHNSON    2,305,572
ROTARY OPERATIVE FASTENER DEVICE AND INSTALLATIONS OF THE SAME
Filed July 3, 1941    2 Sheets-Sheet 1
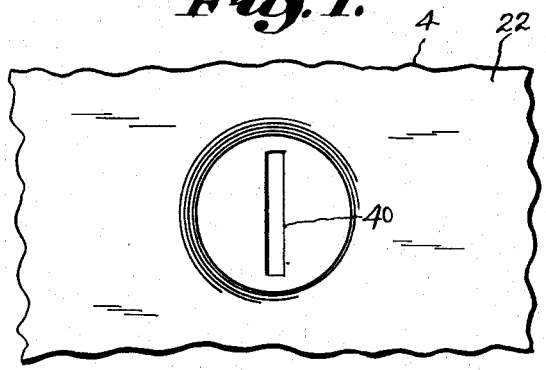
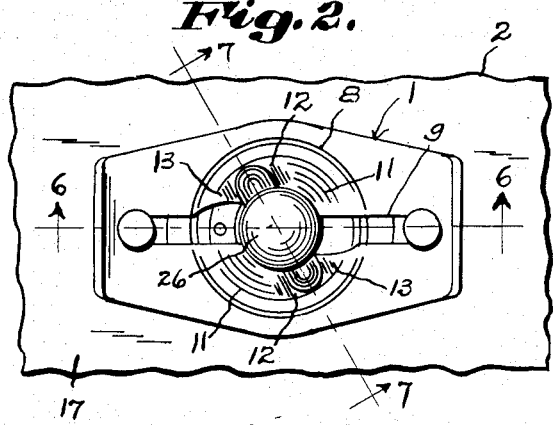
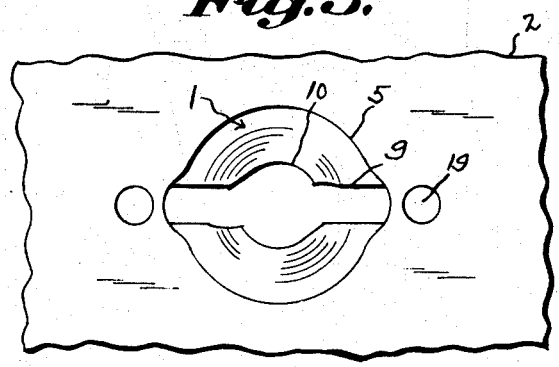
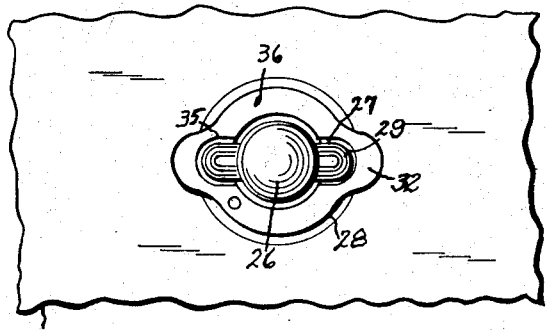
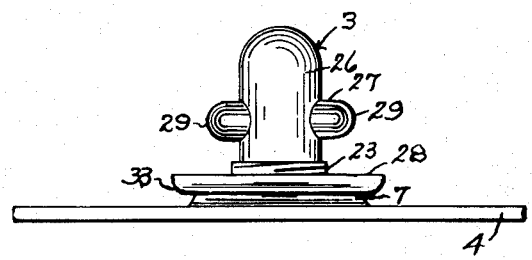
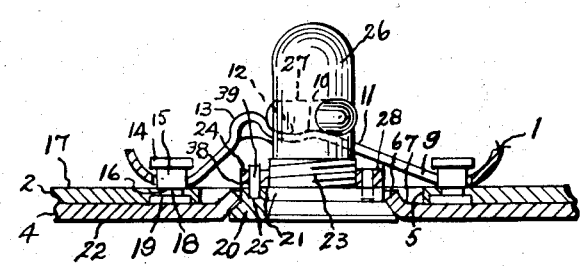
Inventor:
Frank E. Johnson.
By John Todd Att'y.

Dec. 15, 1942.   F. E. JOHNSON   2,305,572
ROTARY OPERATIVE FASTENER DEVICE AND INSTALLATIONS OF THE SAME
Filed July 3, 1941   2 Sheets-Sheet 2
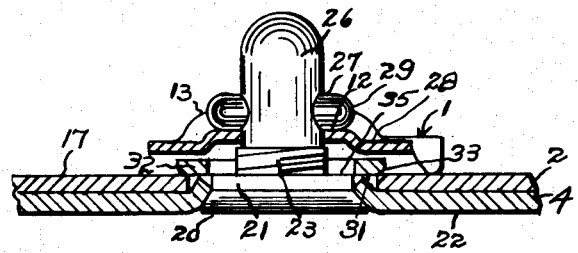
Fig. 7.
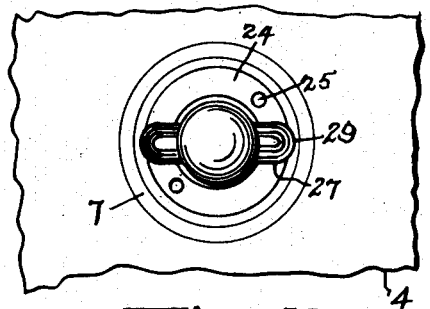
Fig. 8.
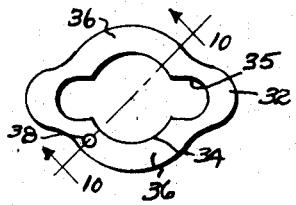
Fig. 9.
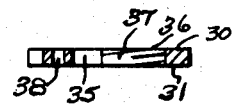
Fig. 10.
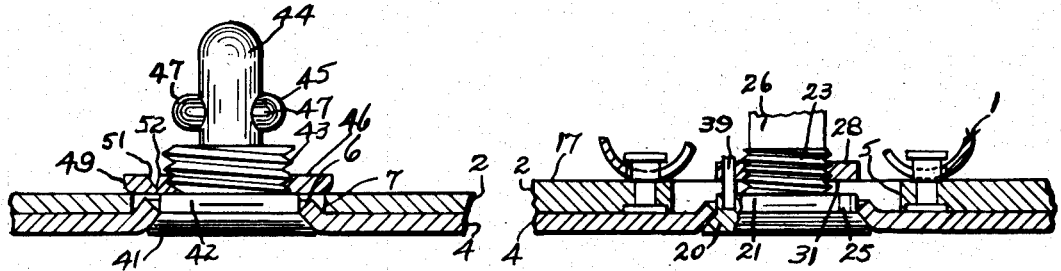
Fig. 12.   Fig. 11.
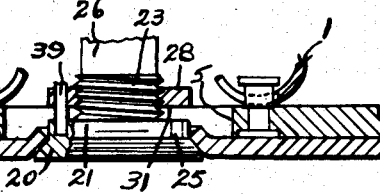
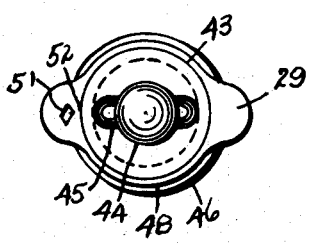
Fig. 13.
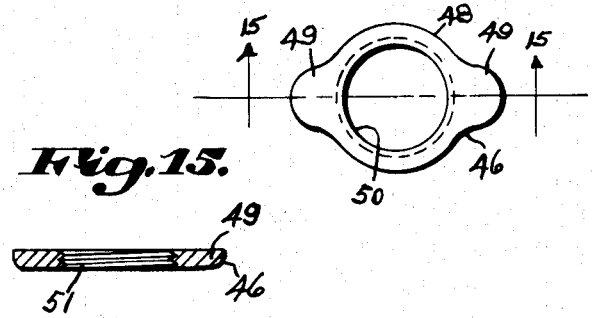
Fig. 14.
Fig. 15.
Inventor:
Frank E. Johnson.
By John Todd
Att'y.

Patented Dec. 15, 1942

2,305,572

UNITED STATES PATENT OFFICE 2,305,572

ROTARY OPERATIVE FASTENER DEVICE AND INSTALLATION OF THE SAME

Frank E. Johnson, Malden, Mass., assignor to United-Carr Fastener Corporation, Cambridge, Mass., a corporation of Massachusetts Application July 3, 1941, Serial No. 400,936

10 Claims. (Cl. 24—221)

This invention aims to provide improvements in fasteners for securing together two or more members preferably plate-like, the fasteners being of the so-called rotary operative type, and being adapted to lock the plate members against any appreciable movement away from each other.

My invention is directed particularly to improvements in a fastener device intended to secure two or more apertured members together in face-to-face relation and operating in a way to prevent any movement of the plates in a direction flatwise away from each other when the parts of the fastener device are in full locked relation. Broadly, the fastener includes a rotary stud unit having a head on the outside of the apertured members and a shank extending through the members. The shank has a pair of lateral projections which are in spaced relation axially of the shank. One of the projections overlies the inner surface of the inner apertured member when the stud is turned to fastening position, thereby to hold all of the apertured members in close face-to-face engagement. The other projection cooperates with a spring element located at the inner face of the installation to hold the stud unit in fastening position while permitting release by positive rotation of the stud. My fastener device is particularly useful when used on airplanes having a high rate of speed as it operates to resist movement of the plates flatwise away from each other as a result of a flow of air entering between the plates.

One of the objects of my invention relates to the construction of the rotary stud unit, wherein the projecting element which is disposed nearest the stud head to engage the inner apertured member is assembled with the stud by a novel method after the stud shank, carrying the other projecting element, is extended through the outside apertured member.

Another object of my invention relates to the novel construction of the rotary stud unit, wherein the projecting element nearest the stud head is adjustable to a multiple number of positions along the length of the stud shank so as to compensate for various thicknesses of the apertured members to be secured together.

Other objects and uses of my invention will be apparent from inspection of the drawings and specification hereinbelow set forth.

Referring to the drawings in which I have shown preferred embodiments of my invention:

Fig. 1 is a front view of an installation secured by my first form of improved fastener device;

Fig. 2 is a rear view of the installation shown in Fig. 1;

Fig. 3 is a front view of one of the apertured members carrying a spring member adapted for cooperation with the stud unit to hold the parts in locked relation;

Fig. 4 is a rear view of the stud unit of my first form of fastener in assembly with the outer part to be secured;

Fig. 5 is a side elevation of the combination shown in Fig. 4;

Fig. 6 is a sectional view taken on the line 6—6 of Fig. 2;

Fig. 7 is a sectional view taken on the line 7—7 of Fig. 2;

Fig. 8 is an end view of the rotary stud unit before attachment of the adjustable projecting element which forms a part of the unit;

Fig. 9 is a plan view of a adjustable projecting element forming a part of my first form of stud unit;

Fig. 10 is a section taken on the line 10—10 of Fig. 9;

Fig. 11 is a view similar to Fig. 6 and showing operation of my fastener device to secure apertured members having a greater combined thickness;

Fig. 12 is a sectional view of a stud unit showing a modified way of securing the adjustable element in assembly with the stud;

Fig. 13 is an end view of the installation shown in Fig. 12;

Fig. 14 is a plan view of my second form of projecting element; and

Fig. 15 is a section taken on the line 15—15 of Fig. 14.

Referring to my first form of fastener device illustrated in Figs. 1-11 of the drawings, the device comprises two units, namely: a spring or locking member 1 secured on the inner side of an inner plate 2 and a rotary unit 3 carried by an outer plate 4. The rotary unit 3 cooperates with the spring member 1 to secure the plates 2 and 4 in flat abutting engagement, as hereinafter described. The plate 2 in my preferred construction has an elongated opening 5 of predetermined shape and the plate 4 has an opening 6 surrounded by a frustro-conical embossment 7 (Fig. 6).

The spring member 1 is of elongated shape and preferably formed from heat-treated metal to provide toughness and resilience. The spring member has a central embossed portion 8 (Fig. 2) divided by a slot 9 which extends to substantially opposite ends of the spring. The slot 9 provides a large central opening 10 (Fig. 3) in registration with the opening 5 of the plate 2 to receive a portion of the rotary unit in final assembly of the parts. The embossed portion 8 is shaped in a way to provide opposed cam portions 11—11 and opposed detent portions 12—12 (Figs. 2, 6, and 7). Stop portions 13 are provided on opposite sides of the detents 12—12 from the inclined surfaces 11. The spring member 1 is assembled with the inner plate 2 by means of a pair of rivets, each of which has a head 14 overlying the spring member, a shank 15 extending through the slot 9 of the spring member at a respective end thereof and a shoulder 16 abutting the inner surface 17 of the plate 2. A neck portion 18 forming a continuation of the shank 15 extends through an opening of the plate 2 and has a head 19 disposed within a countersunk opening of the plate 2, as most clearly shown in Fig. 6. Thus, the rivets cooperate with the spring member in a way to hold it in attachment to the plate 2 while permitting a certain amount of float thereof.

The stud unit 3 comprises a head portion which is preferably of generally frustro-conical shape and provides an outermost end portion 20 which is larger in diameter than the opening 6 of the plate 4 and an inner end portion 21 which is slightly smaller in diameter than the opening 6, whereby the head is disposed in substantially complementary relation to the embossment 7 when the parts of the fastener are in locked engagement with the end 20 lying substantially flush with the outer surface 22 of the plate member 4, as most clearly shown in Figs. 6 and 7. A shank extends from the stud head having an annular threaded portion 23 adjacent the head. The outside diameter of the threaded portion is less than the diameter of the inner end 21 of the stud head whereby the inner end 21 provides a face or shoulder 24 (Fig. 8) surrounding the threaded portion 23 adjacent its junction with the end 21. The stud head has a pair of openings 25 spaced apart 180° and extending axially of the stud unit from the shoulder 24 in the direction of the outer end 20 for a purpose to be described. A nose 26 extends from the threaded portion 23 and is adapted to project through the enlarged portion 10 of the slot 9 of the spring member during assembly of the parts of the fastener device. The stud unit carries upper and lower laterally projecting elements 27 and 28 respectively and these elements are spaced one from another lengthwise of the stud unit. The upper element 27 is preferably in the form of a pin driven through the nose 26 and providing ends 29 projecting laterally on opposite sides of the nose 26. The lower element or locking member 28 is adjustable along the length of the shank and is adapted to be secured to the shank at varying spaced distances from the stud head for a purpose to be described. The openings 25 are positioned circumferentially of the ends 29 in predetermined position relative to the axis of the pin element 27 for a purpose to be described.

Referring in detail to the lower element 28, my preferred form is in the shape of an elongated disk having flat upper and lower surfaces 30 and 31 (Fig. 10). The disk, in my first form, has a generally circular central portion and provides laterally projecting elements 32 on diametrically opposed sides of the central portion. The elements 32 may have a slight radius 33 (Fig. 7) on the lower surface 31 adjacent the outermost ends thereof for a purpose to be described. The central portion has a circular opening 34 and slots 35 on opposed sides of the circular opening 34 extending into the respective elements 32, as shown in Fig. 9. The disk provides arc-shaped portions 36 immediately adjacent the central opening 34 and the walls of the portions 36 are threaded as at 37 (Fig. 10) for cooperative threaded engagement with the threaded portion 23 of the stud shank. One of the arc-shaped portions has an aperture 38 having the same diameter as the openings 25 of the stud head and spaced a predetermined distance from the axis of the stud to align with the openings 25 of the stud head as the disk is threaded into engagement with the threaded portion 23. The opening 38 is spaced a predetermined distance from the elements 32 circumferentially of the central portion so that the axis of the disk will register with the axis of the pin 27 when the opening 38 is in alignment with one of the stud openings 25.

Assembly of the rotary unit 3 with the outer plate 4 is a simple matter and is carried out through inserting the nose 26 and the pin 27 through the opening 6 of the plate 4 by a tipping action. Thereafter, the disk element 28 is moved over the free end of the nose and the pin 27 by registering the ends 29 of the element 27 with the slots 35 of the disk element. The disk element is then moved into engagement with the threaded portion 23 of the stud shank and turned to engage the threads 37 with the threads 23 of the stud shank and relative rotation of the parts is continued until the lower surface 31 of the disk element is spaced from the shoulder 24 of the stud head, a distance approximately equal to the combined thicknesses of the plates 2 and 4. When the disk element is in approximately the proper spaced position relative to the shoulder 24 the opening 38 thereof is aligned with one of the openings 25 of the stud head. This will cause the axis of the disk element to register with the axis of the pin 37. Thereafter, a pin 39 is moved into the aligned openings to engage the walls of the openings in a drive-fit, thereby prohibiting further rotation of the disk member in either direction and fastening the parts in secure assembly.

In the installation shown in Figs. 6 and 7 the plates 2 and 4 are of such combined thickness that the disk element in final applied position abuts the shoulder 24 of the stud head, as most clearly shown in Fig. 6. In Fig. 11 I have shown an installation which is similar to that of Figs. 6 and 7, but providing plates 2 and 4 which have a greater combined thickness. As a result the disk element, instead of resting upon the shoulder 24 of the stud head in final assembly in the manner of the installation of Fig. 6, will be spaced from the shoulder to compensate for the increased thickness.

To assemble the plates 2 and 4 by means of my improved fastener it is only necessary to bring the plates into superposed position with the aperture 6 of the plate 4 in substantial alignment with the aperture 5 of the plate 2. During this operation the nose 26 of the stud unit passes through the aperture 5 of the plate 2 and the opening 10 of the spring member 1. If the disk element 28 is in alignment with the opening 5 the pin element 27 will fall into registration with the slot 9 of the spring member, but if the parts are not in alignment rotation of the stud unit by inserting a suitable tool in the slot 40 (Fig. 1) will bring them into alignment. Continued rotation of the fastener in a clockwise direction, viewing Fig. 1, causes the pin ends 29—29 to engage the cam portions 11—11 of the spring member 1 and the spring will thus be compressed until the pin ends 29 reach the respective detent portions 12—12. The fastener is now in locked position and is held against accidental unlocking by the tension of the spring member against the pin element 27. During this rotative movement by which the pin element 27 is locked in engagement with the spring member the disk element 28 rotates into the position shown in Figs. 6 and 7. The projection elements 32 of the disk element bear against the inner surface 17 of the plate 2 with the result that the plate members 2 and 4 are held between the outermost end portion of the stud head and the disk element, thereby preventing any appreciable movement of the plates flatwise away from each other. It will be seen that the radii 33 provided on the projecting elements 32 of the disk member may operate as cams to facilitate the movement of the disk element into superposed locked engagement with the inner surface 17 of the inner plate 2.

In Figs. 12-15 I have illustrated a modified form of rotary unit which may offer some advantages over the first form. My second form of stud unit is designed for cooperative fastener engagement with a spring member similar to that shown in Fig. 2, but which may have different dimensions to conform to the altered dimensions provided by certain elements of the rotary unit. My second form of rotary unit has a stud member providing a head having an enlarged outer end 41 and an inner end 42 of a diameter less than the opening of the outer plate through which it is to extend. A shank extends from the stud head, having a threaded portion 43 of a greater diameter than the threaded portion of my first form. A nose 44 extends from the threaded portion which has a diameter substantially less than the diameter of the threaded portion for a purpose to be described. The stud unit carries a pair of projecting elements 45 and 46 respectively which are spaced axially of the shank in the manner of the projecting elements of my first form. The projecting element 45 is in the form of a pin carried by the nose 44 and having end portions 47 projecting on opposite sides of the nose. The length of the pin 45 is less than the root diameter of the threaded portion 43 for a purpose to be described. The element 46 is generally disk-shaped, but is constructed slightly differently from the disk element of my first form in order to increase the strength of the same. The disk comprises a circular central portion 48 and projecting elements 49 on opposed sides of the central portion. The disk has a central opening 50 which provides a larger diameter than the length of the pin 45. The wall of the disk element adjacent the opening 50 is threaded, as at 51, for cooperative threaded engagement with the threaded portion 43 of the stud shank.

In assembling my second form of rotary unit with the outer plate 2 the shank of the unit is moved through the opening 6 of the outer plate. After this action the disk element 46 is moved over the stud nose and down into engagement with the threaded portion 43. As a result of this effect the opening 50 of the threaded portion has a greater diameter than the length of the pin 45, and the disk member is easily slipped over the pin to engage the threaded portion 43.

Next, the disk 46 is rotated until its lower surface is in predetermined spaced position relative to the outer end 41 of the stud head. Instead of providing a pin entering aligned openings of the disk element and stud head for preventing relative rotation in the manner of my first form, I have chosen to secure the disk element of my second form against rotation by striking the disk element with a suitable tool adjacent the opening 50 as at 51 (Figs. 12 and 13) so as to deform the wall of the opening 50 and force a portion 52 of the wall into binding engagement with the threads of the portion 43, thereby preventing rotation of the disk element in either direction. My second form of disk member omits the slots 35 of my first form, thereby providing a continuous annular thread and, at the same time, effecting a stronger member.

Thus, my fastener devices operate to prevent relative flatwise movement of the plates to be secured and, at the same time, the devices are capable of compensating for various combined thicknesses of the plates to be secured by adjusting the disk element nearest the head contemporaneously with the assembly of the rotary unit with the outer plate member.

Although I have illustrated and described the preferred embodiments of my invention I do not wish to be limited thereby because the scope of my invention is best defined by the following claims.

I claim:

1. In a fastener device of the rotary operative type, a plurality of apertured members to be fastened together, a stud unit having a shank passing through the said members, a locking member carried by said shank, said locking member projecting laterally from said shank and overlying the inner surface of the inner apertured member when the stud is turned to fastening position thereby to hold all of the apertured members in close face-to-face engagement, said locking member having an opening receiving an end of said shank whereby said locking member is assembled with said shank over an end thereof and interengaging means formed as a part of the stud unit and cooperating to secure said locking member in predetermined position along the length of said shank.

2. In a fastener device of the rotary operative type, a plurality of apertured members to be fastened together, a stud unit having a shank passing through the said members, said shank having a threaded portion, a locking member carried by said shank, said locking member having an element projecting laterally from said shank and overlying the inner surface of the inner apertured member when the stud is turned to fastening position thereby to hold all of the apertured members in close face-to-face engagement, said locking member having a threaded portion cooperating with said threaded portion of said shank to effect adjustment of said locking member lengthwise of said shank by relative rotation of said parts.

3. In a fastener device of the rotary operative type, a plurality of apertured members to be fastened together, a stud unit having a shank passing through the said members, said shank having an externally threaded portion, a locking member carried by said shank, said locking member having an element projecting laterally from said shank and overlying the inner surface of the inner apertured member when the stud is turned to fastening position thereby to hold all of the apertured members in close face-to-face engagement, said locking member having an opening and a wall adjacent said opening having a thread, said locking member receiving an end of said shank through said opening and being movable into predetermined position lengthwise of said shank by relative rotation of said parts in threaded engagement.

4. In a fastener device of the rotary operative type, a plurality of apertured members to be fastened together, a stud unit having a shank passing through the said members, said shank having an externally threaded portion, a locking member carried by said shank, said locking member having an element projecting laterally from said shank and overlying the inner surface of the inner apertured member when the stud is turned to fastening position thereby to hold all of the apertured members in close face-to-face engagement, said locking member having an opening and a wall adjacent said opening having a thread, said locking member receiving an end of said shank through said opening and movable into predetermined position lengthwise of said shank by relative rotation of said parts in threaded engagement and said shank and locking member having cooperating means maintaining said parts in predetermined position against relative rotation.

5. In a fastener device of the rotary operative type, a plurality of apertured members to be fastened together, a stud unit having a head bearing against the outer surface of one apertured member and a shank extending through all of said apertured members, a pair of lateral projections carried by said shank and disposed in spaced relation lengthwise of said shank, one of said projections overlying the inner surface of the inner apertured member when the stud is turned to fastening position thereby to hold all of the apertured members in close face-to-face engagement, stud-holding means located at the inner face of the installation engaging said other projection to hold the stud in fastening position while permitting release by positive rotation of the said stud, and one of said projections having means cooperating with said stud unit so as to be shiftable to varying positions along the length of said shank thereby to compensate for various thicknesses of said apertured members.

6. In a rotary fastener for use in an installation of the class described, a stud member having a head provided with means by which the stud may be rotated, a pair of laterally projecting elements carried by said stud member, the first of said elements being spaced from said head and adapted to cooperate with said head to lock the parts of the installation against substantial separating movement, said stud member and said first element having co-engaging threads whereby said parts are assembled together, and a second part of the fastener having means for cooperation with the second of said elements to hold the stud in installation-locking position.

7. In a rotary fastener for use in an installation of the class described, a stud member having a head provided with means by which the stud may be rotated and a shank, said shank having an external threaded portion, an element carried by said shank having projections extending laterally on opposed sides of said shank, said element being spaced from said head, and a second element carried by said shank intermediate said element and said head and having laterally extending projections, said second element having an opening to clear said laterally-extending projections of said first element and a wall adjacent said opening having a thread for co-engagement with said threaded portion of said stud unit to secure said second element in assembly with said stud, said second element receiving an end of said shank and said lateral projections of said first element through said opening and being thereafter screwed into predetermined position lengthwise of said shank.

8. In a rotary fastener for use in an installation of the class described, a stud member having a head provided with means by which the stud may be rotated and a shank, said shank having an external threaded portion, a crosspin carried by said shank having end portions extending laterally on opposed sides of said shank, said crosspin being spaced from said head, and a second element carried by said shank intermediate said crosspin and said head and having laterally extending projections, said second element having an opening to clear said end portions of said crosspin and a wall adjacent said opening having a thread for co-engagement with said threaded portion of said stud unit, said second element receiving an end of said shank and said end portions of said crosspin through said opening and thereafter screwed into predetermined position lengthwise of said shank and said second element and stud unit having cooperating locking means engaging to limit rotation of one part relative to the other after said second element is disposed in final position.

9. In a fastener device of the rotary operative type, a plurality of apertured members to be fastened together, a stud unit having a head on one side of said apertured members and a shank passing through the said members, said shank having a threaded portion adjacent said head, a locking member carried by said shank, said locking member having an element projecting laterally from said shank and overlying the inner surface of the inner apertured member when the stud is turned to fastening position thereby to hold all of the apertured members in close face-to-face engagement, said locking member having a threaded portion cooperating with said threaded portion of said shank to effect adjustment of said locking member lengthwise of said shank by relative rotation of said parts, and said locking member and stud head having co-engaging means to maintain said parts in fixed relative position.

10. In a fastener device of the rotary operative type, a plurality of apertured members to be fastened together, a stud unit having a head on one side of said apertured members and a shank passing through the said members, said shank having a threaded portion adjacent said head, a locking member carried by said shank, said locking member having an element projecting laterally from said shank and overlying the inner surface of the inner apertured member when the stud is turned to fastening position thereby to hold all of the apertured members in close face-to-face engagement, said locking member having a threaded portion cooperating with said threaded portion of said shank to effect adjustment of said locking member lengthwise of said shank by relative rotation of said parts, and said locking member and threaded portion having co-engaging means to maintain said parts in fixed relative position.

FRANK E. JOHNSON.